United States Patent
Ren et al.

(10) Patent No.: US 8,325,983 B2
(45) Date of Patent: Dec. 4, 2012

(54) COMBINATION DETECTOR AND OBJECT DETECTION METHOD USING THE SAME

(75) Inventors: Haibing Ren, Beijing (CN); Jung Bae Kim, Hwaseong-si (KR); Jong Ha Lee, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 611 days.

(21) Appl. No.: 12/585,570

(22) Filed: Sep. 17, 2009

(65) Prior Publication Data

US 2010/0074470 A1 Mar. 25, 2010

(30) Foreign Application Priority Data

Sep. 22, 2008 (CN) .......................... 2008 1 0149265
Aug. 25, 2009 (KR) ........................ 10-2009-0078529

(51) Int. Cl.
*G06K 9/00* (2006.01)
(52) U.S. Cl. ...................................... 382/103
(58) Field of Classification Search .................. 382/103, 382/118, 170; 340/5.54; 348/169
See application file for complete search history.

(56) References Cited

U.S. PATENT DOCUMENTS

2006/0120572 A1* 6/2006 Li et al. .......................... 382/118
2007/0183638 A1* 8/2007 Nakamura .................... 382/128

OTHER PUBLICATIONS

Bernhard et al. "Face Detection with the Modified Census Transform", International Conference on Automatic Face and Gesture Recognition, IEEE 2004).*

* cited by examiner

*Primary Examiner* — Vu Le
*Assistant Examiner* — Amara Abdi
(74) *Attorney, Agent, or Firm* — Staas & Halsey LLP

(57) ABSTRACT

Provided are a detector and a method of detecting an object using the detector. The method includes combining a first detector and a second detector in a combination scheme to form a multi-layer combination detector, the second detector being of a type different from that of the first detector, processing a binary classification detection with respect to an inputted sample starting from an uppermost layer detector, allowing a sample of an object detected from a current layer to approach a lower layer, while rejecting a sample of a non-object detected from the current layer whereby the rejected non-object may not approach the lower layer, and outputting a sample passing through all layers as a detected object.

22 Claims, 7 Drawing Sheets

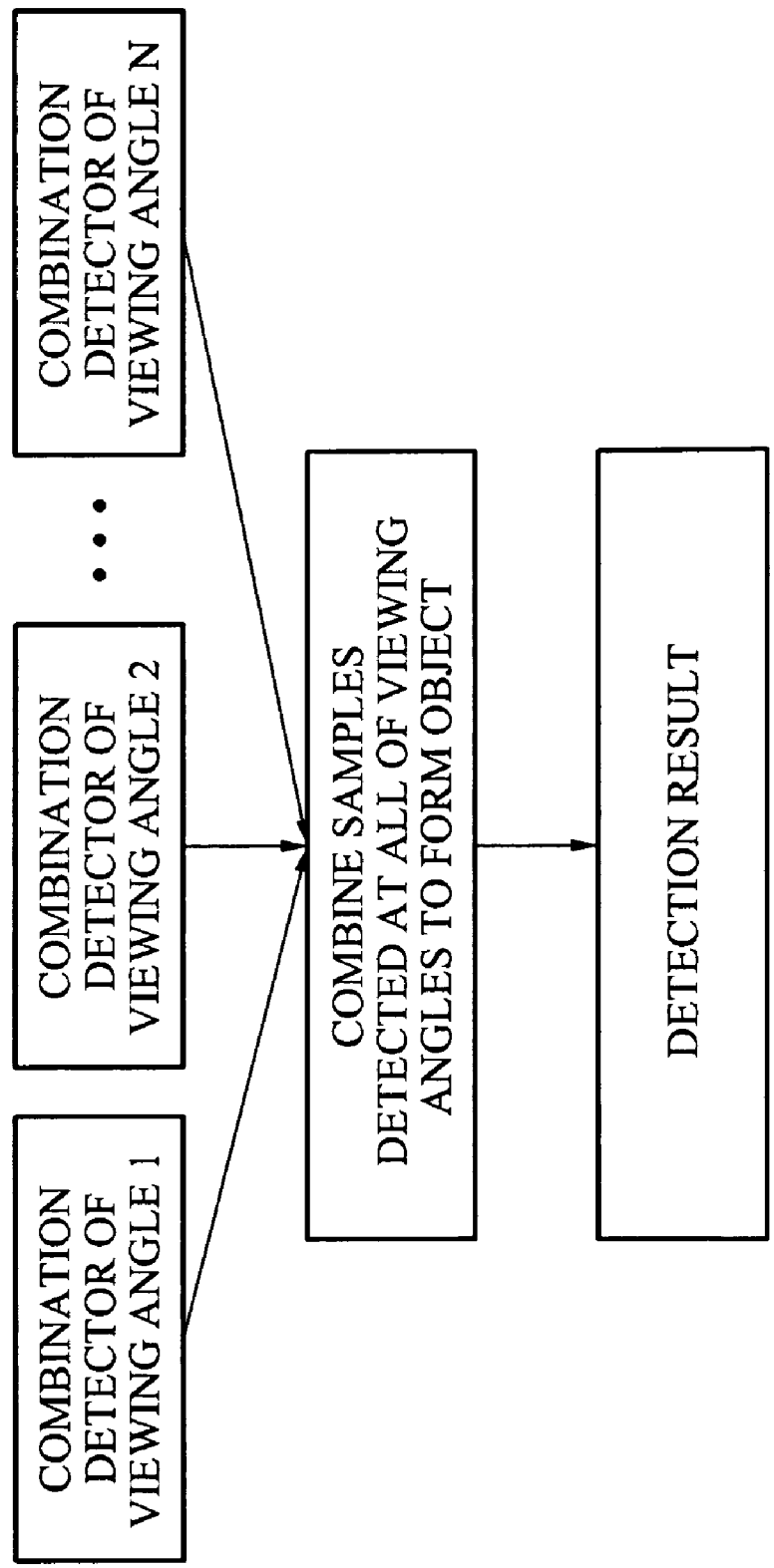

COMBINATION DETECTOR AND OBJECT DETECTION METHOD USING THE SAME

CROSS-REFERENCE TO RELATED APPLICATIONS

This application claims the benefit of Chinese Patent Application No. 200810149265.2, filed on Sep. 22, 2008, in the Chinese States Intellectual Property Office, and the benefit of Korean Patent Application No. 10-2009-0078529, filed on Aug. 25, 2009, in the Korean Intellectual Property Office, the disclosures of which are incorporated herein by reference.

BACKGROUND

1. Field

Exemplary embodiments relate to a detector and a method of detecting an object using the detector.

2. Description of the Related Art

Object detection may be a foundation of an application field such as management of media contents, smart control, and the like, and also may be a significantly important technology of the application field. In particular, detection of a face of a human may be widely used in an application field such as identification, smart control, smart cameras, and the like, as an important part of the object detection.

In the related arts, object detection may be performed using a single detector. As examples of the single detector, a Haar detector, a Scale Invariant Feature Transform (SIFT) detector, a Modified Census Transform (MCT) detector, a Non-negative Matrix Factorization (NMF), and the like may be used. FIGS. 1A, 1B, and 1C are diagrams respectively illustrating Haar edge characteristics, Haar line characteristics, and Haar expansion characteristics according to a related art. The Haar edge characteristics may be used in a configuration edge characteristic detector, the Haar line characteristics may be used in a configuration line characteristic detector, and the Haar expansion characteristics may be used in a point/diagonal line characteristic detector.

The Haar characteristics may be calculated by the following Equation 1.

$$h(x) = \sum_{i \in R} w_i p_i, \quad \text{Equation 1}$$

where 'R' denotes a predetermined part area, 'i' denotes a pixel within an area, '$p_i$' denotes a gray scale value of the pixel, and '$w_i$' denotes a weight of the pixel, which is represented as Equation 2 below.

$$\sum_{i \in R} w_i = 0. \quad \text{Equation 2}$$

A weight sum of the Haar characteristic values may be a discrimination basis for the Haar detector to select a detected sample. Also, the calculated Haar characteristic value may be obtained simply using an image integration method.

FIG. 2 illustrates MCT characteristics of a 3×3 net, according to a related art.

In FIG. 2, each net size is identical to the size of the other nets, and the net may be a single pixel, or a rectangle or a square of which a plurality of pixels are combined while showing MCT characteristics based on the 3×3 net of the related art. FIG. 3 illustrates exemplary MCT characteristics included in a detector according to the related art. In this instance, a white net is denoted as having characteristic value higher than an average value, and a black net is denoted as having characteristic value lower than the average value.

As for the MCT characteristic value, a sum of pixel values of respective nets based on the 3×3 net may be a characteristic value of a net. With a comparison between the characteristic value of the net and an average value of characteristic values of all nets, '0' or '1' may be obtained. Since integers of '0' to '511' may be obtained based on a compared result of nine nets, the MCT characteristic value may be obtained using an index.

An index address of the MCT characteristics value may be calculated by the following Equation 3.

$$m(x) = \sum_{i=1}^{9} s(g_i - g_c) \times 2^i, \quad \text{Equation 3}$$

where '$g_i$' denotes an i-th element value of the 3×3 net, and '$g_c$' denotes an average value of the net, which is represented as Equation 4.

$$g_c = \frac{1}{9} \sum_{i=1}^{9} g_i. \quad \text{Equation 4}$$

s(x) denotes a function having two values, which is represented as Equation 5.

$$s(x) = \begin{cases} 1 & x \geq 0 \\ 0 & x < 0. \end{cases} \quad \text{Equation 5}$$

The MCT characteristics values may be obtained by a comparison between each element value and the average value, and may be resistant to noise and illumination.

Also, each element of the 3×3 net may be a single pixel, or a rectangular area or a square area. Similar to the Haar characteristics, a weight sum of the MCT characteristics values may be a discrimination basis of the MCT detector to select a detected sample. In addition, the index address of the MCT characteristic values may be simply obtained using the image integration method.

However, in the related arts, all of the Haar detector, the MCT detector, the SIFT detector, and the NMF detector may have a significant limitation due to a single detector adapted by each of the Haar detector, the MCT detector, the SIFT detector, and the NMF detector, and thus, it is difficult to implement a rapid and accurate object detection. For example, as can be seen from FIGS. 1A to 3, the Haar detector may have a simple structure, and may be operated with a relatively rapid speed, however, many Haar detectors may need to be combined for the purpose of classifying complex characteristics, resulting in significantly deteriorated efficiency. The SIFT detector may have a complex structure, and may be operated in a relatively slow speed, and thus it is difficult to implement a current rapid object detection. In addition, the MCT detector, although convenient for classifying relatively complex characteristics, may have a relatively complex structure and may be operated with a relatively slow speed.

Accordingly, there is a desire for a method that will overcome problems associated with the single detector and that will perform rapid and accurate object detection.

SUMMARY

An aspect of exemplary embodiments provides a detector and a method of detecting an object using the detector that may overcome limitations of a single detector while performing object detection with respect to an image detected in a multi-layer scheme, thereby achieving a rapid and accurate object detection.

Additional aspects and/or advantages will be set forth in part in the description which follows and, in part, will be apparent from the description, or may be learned by practice of the embodiments.

According to an aspect of exemplary embodiments, there is provided a method of detecting an object using a combination detector, the method including: combining a first detector and a second detector in a combination scheme to form a multi-layer combination detector, the second detector being of a type different from that of the first detector; processing a binary classification detection with respect to an inputted sample starting from an uppermost layer detector; allowing a sample of an object detected from a current layer to approach a lower layer, and rejecting a sample of a non-object detected from the current layer to approach the lower layer; and outputting a sample passing through all layers as a detected object.

In this instance, the first detector may be a Haar detector, and the second detector may be a Modified Census Transform (MCT) detector.

Also, the first detector may be the Haar detector, and the second detector may be a Scale Invariant Feature Transform (SIFT) detector.

Also, the first detector may be the Haar detector, and the second detector may be a Non-negative Matrix Factorization (NMF) detector.

Also, in the combination scheme, the first detector may be located in n-layers sequentially from the uppermost layer of the multi-layer combination detector, and the second detector may be located in an (n+1)-layer to an (n+m)-layer of remaining layers of the multi-layer combination detector.

Also, values of 'n' and 'm' may be determined depending on experiences and measured results.

Also, in the combination scheme, the first detector and the second detector may be alternately located in each layer of the multiple layers.

Also, the first detector may be located in an odd numbered layer, and the second detector may be located in an even numbered layer.

Also, the combination scheme may set a performance function based on a detection speed and a detection effect of a sample to train each of the first detector and the second detector, and select, as a detector of a corresponding layer, a detector in which a selection performance of each layer is relatively superior based on the training result.

According to another aspect of exemplary embodiments, there is provided a method of detecting an object using a combination detector, the method including: classifying a plurality of appearance images into a plurality of sub classes in accordance with a viewing angle; combining a first detector and a second detector in a combination scheme with respect to the each of the plurality of sub classes to form a multi-layer combination detector, the second detector being a type different from that of the first detector; processing a binary classification detection with respect to an inputted sample starting from an uppermost layer detector; allowing a sample of an object detected from a current layer to approach a lower layer; rejecting a sample of an non-object detected from the current layer to approach the lower layer; and combining samples finally outputted by the combination detector of each of the plurality of sub classes to form the combined samples as a detected object.

According to still another aspect of exemplary embodiments, there is provided a medium comprising computer readable instructions implementing the method of detecting the object using the combination detector.

According to yet another aspect of exemplary embodiments, there is provided a combination detector, in which a first detector and a second detector, the second detector being a type different from that of the first detector, are combined, a binary classification detection with respect to an inputted sample is processed, a sample of an object detected from a current layer is allowed to approach a lower layer, a sample of an non-object detected from the current layer is rejected to approach the lower layer, and a sample passing through all layers is outputted as a detected object.

According to further aspect of exemplary embodiments, there is provided a combination detector, in which a first detector and a second detector, the second detector being a type different from that of the first detector, are combined, a plurality of appearance images are classified into a plurality of sub classes in accordance with a viewing angle, a binary classification detection is processed with respect to an inputted sample of the plurality of sub classes, a sample of an object detected from a current layer is allowed to approach a lower layer, a sample of an non-object detected from the current layer is rejected to approach the lower layer, and final samples passing through all layer are combined as a detected object.

According to exemplary embodiments, it is possible to achieve a rapid and accurate object detection by performing an object detection using a combination detector.

BRIEF DESCRIPTION OF THE DRAWINGS

These and/or other aspects will become apparent and more readily appreciated from the following description of exemplary embodiments, taken in conjunction with the accompanying drawings of which:

FIG. 7 is a schematic view illustrating a state where an object is detected using a plurality of viewing angles by a method of detecting an object using a combination detector according to exemplary embodiments.

DETAILED DESCRIPTION

Figure 1A:
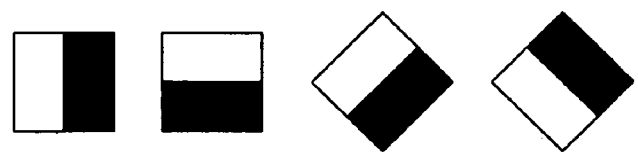
FIGS. 1A, 1B, and 1C are diagrams illustrating Haar edge characteristics, Haar line characteristics, and Haar expansion characteristics according to a related art.
Figure 1B:
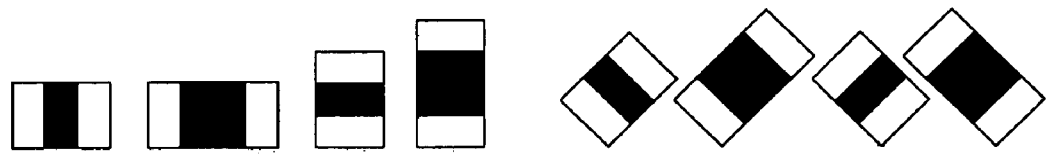
Figure 1C:
Figure 2:
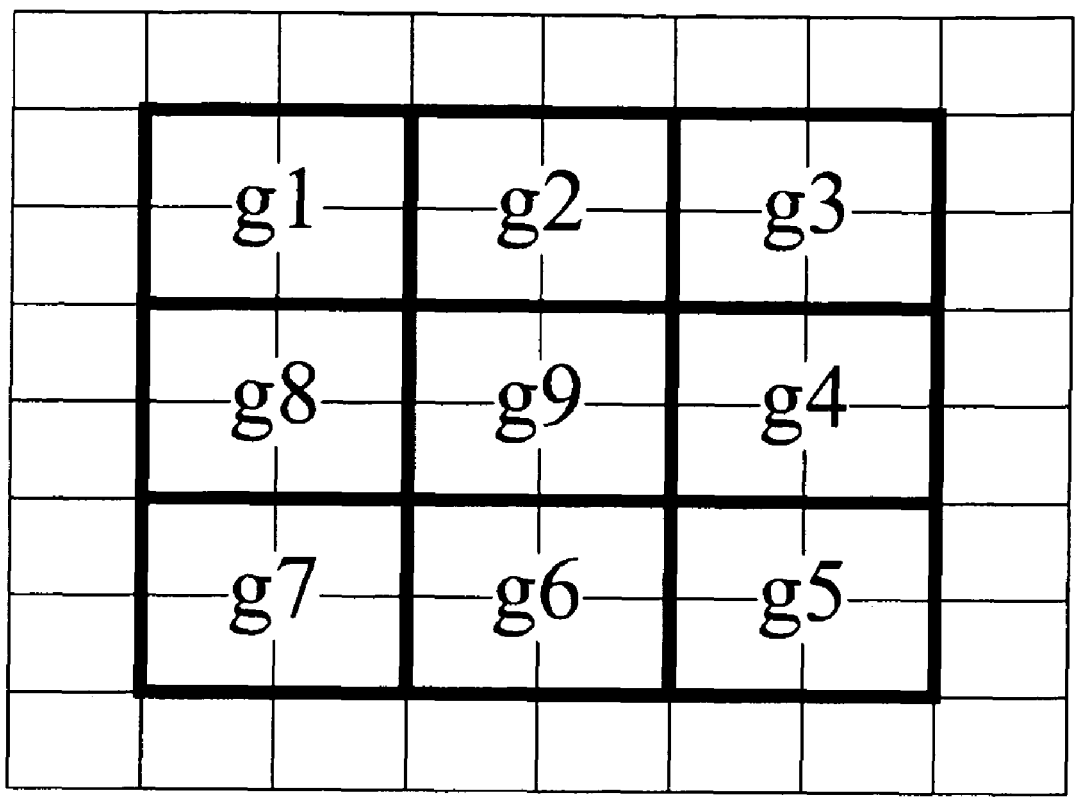
FIG. 2 illustrates MCT characteristics of 3×3 net according to a related art.
Figure 3:
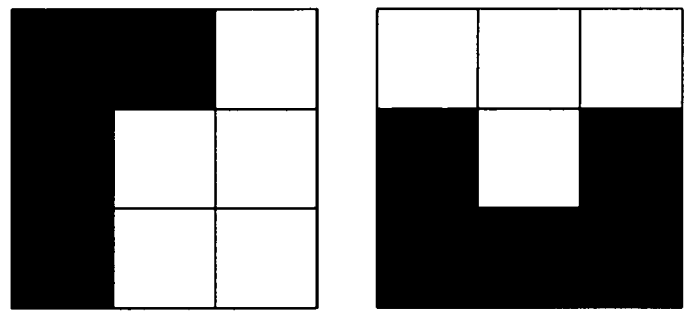
FIG. 3 illustrates exemplary MCT characteristics included in a detector according to a related art.
Figure 3:
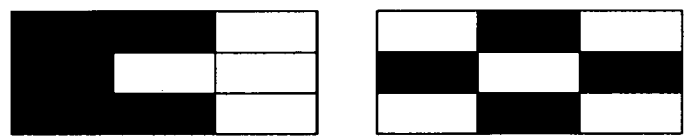
Figure 3:
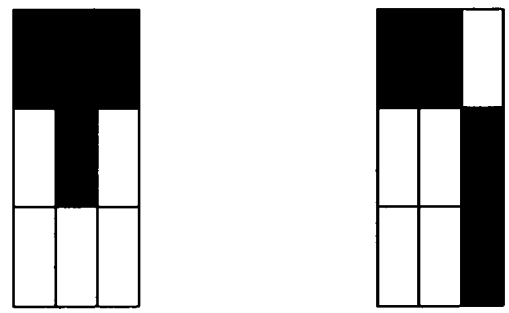
Figure 3:

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

According to exemplary embodiments, a divided layer structure may be adapted for each detector of a combination detector, and each layer may allow a sample of an object, detected using a binary classification device, to be passed therethrough and to be transmitted to a lower layer. The lower layer, however, may reject a sample, detected as a non-object, thereby not allowing the rejected sample to be passed through to a corresponding layer. In a specific detection process, a weight sum of the above described characteristic values may be used as a discrimination basis, and a sample may be selected through a comparison with a threshold value. In this manner, the sample may pass downwardly through each layer, and only a sample finally determined as an object may pass through every layer. According to exemplary embodiments, there is disclosed a method of detecting an object in a combination scheme of various detectors based on characteristics of a detected object and characteristics of sample detection of various detectors. Hereinafter, exemplary embodiments will be described in detail with reference to FIGS. 4 to 7.

Figure 4:
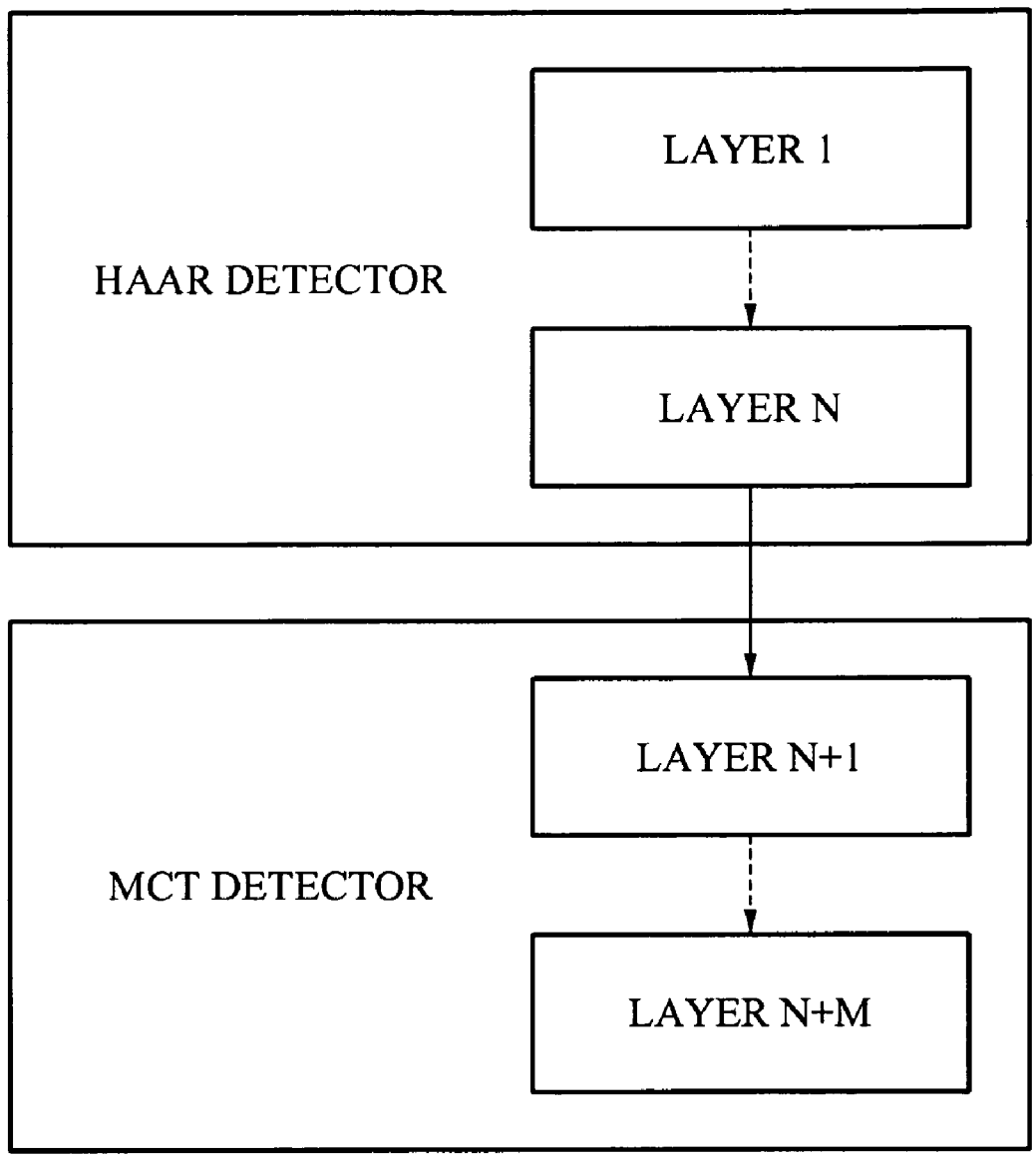
FIG. 4 is a schematic view illustrating a method of detecting an object using a combination detector according to exemplary embodiments.

FIG. 4 is a schematic view illustrating a method of detecting an object using a combination detector according to an exemplary embodiment. Referring to FIG. 4, object detection is performed in a divided layer structure using a combination scheme of a Haar detector and a Modified Census Transform (MCT) detector. Here, since the Haar detector has a simple structure and operates relatively rapidly, the Haar detector may be applicable in an initial process, thereby rapidly removing a simple non-object sample. However, an MCT detector structure may generally be used for classifying relatively complex characteristics, and thus the MCT detector may be suitable for subsequent processes, and to reject a complex non-object sample allowed to pass, for example, by the Haar detector.

As further illustrated in FIG. 4, in a disposition of a multi-layer combination detector, the Haar detector may use initial n-numbered layers, that is, layers ranging from an uppermost layer to an n-layer, and the MCT detector may use subsequent m-numbered layers, that is, layers ranging from an (n+1)-layer to an (n+m)-layer. Here, specific numerals of 'n' and 'm' may be determined by experience and detection results, and thereby a structure having the fastest speed and a superior detection effect may be selected. In this manner, the Haar detector located in the initial n-numbered layers may first remove most non-object samples. The MCT detector located in the subsequent m-numbered layers may remove non-object samples having a relatively complex structure and a relatively smaller number of samples. Accordingly, the total number of non-object samples approaching lower layers may be reduced. However, even though an operation amount of the MCT detector may be relatively great, an operation speed of an entire system may significantly increase due to the relatively fast speed of the Haar detector. A method of determining the n and m is provided merely an example, and thus exemplary embodiments are not limited thereto. The n and m may equally be determined in known methods of related arts as long as a superior detection performance is satisfied using the combination detector.

The combination of the Haar detector and the MCT detector is merely an example, and thus exemplary embodiments are not limited thereto. A person skilled in the art may replace the MCT detector with a Scale Invariant Feature Transform (SIFT) detector, a Non-negative Matrix Factorization (NMF) detector, and the like to form a combination detector with the Haar detector, thereby performing an object detection.

Figure 5:
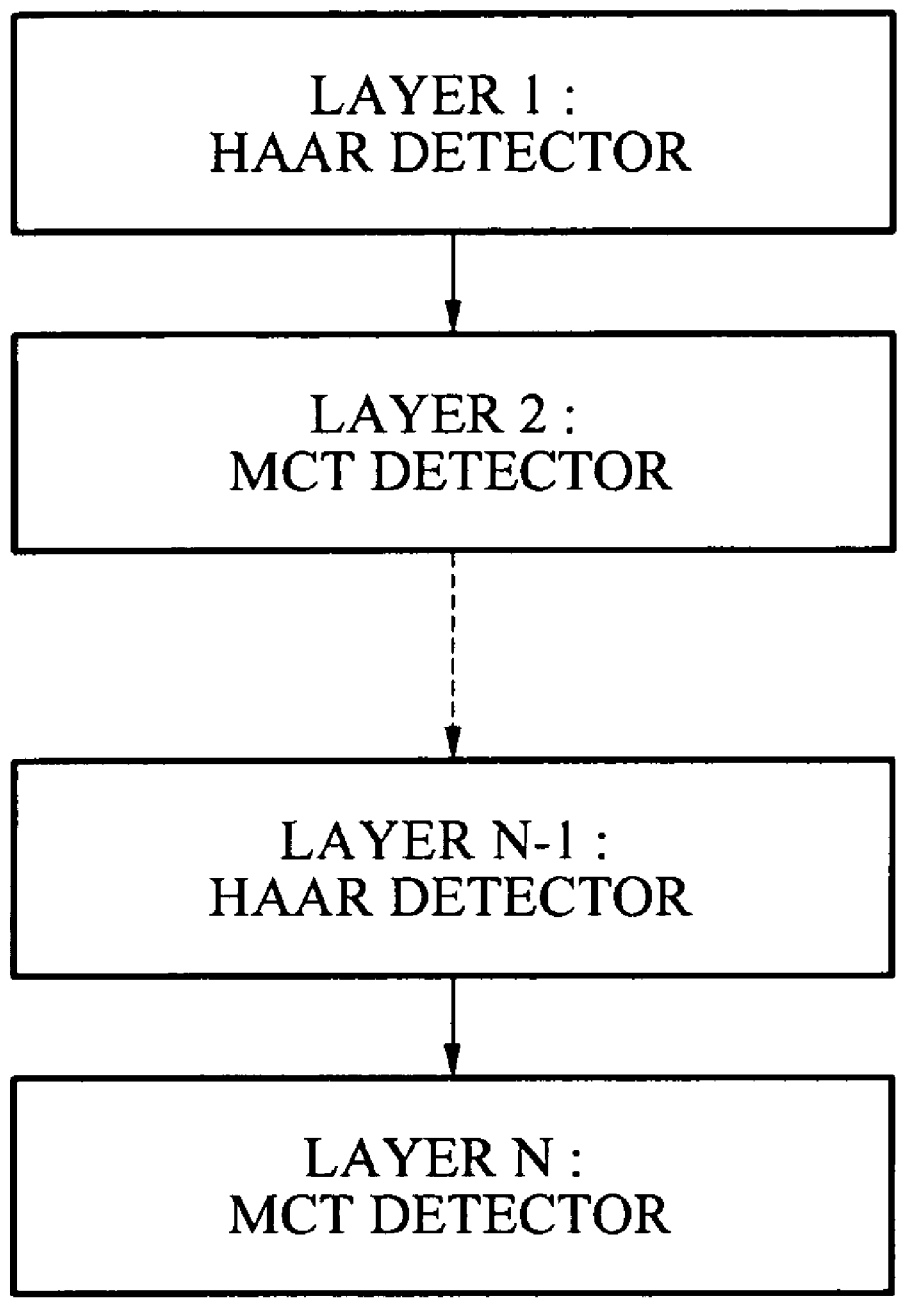
FIG. 5 is a schematic view illustrating a method of detecting an object using a combination detector according to other exemplary embodiments.

FIG. 5 is a schematic view illustrating a method of detecting an object using a combination detector according to other exemplary embodiments. Referring to FIG. 5, object detection may be performed in a divided-layer structure using the Haar detector and the MCT detector. Characteristics of the Haar detector and of the MCT detector may be complementary to each other and thereby the Haar detector and the MCT detector may be alternatively disposed. As illustrated in FIG. 5, as for disposition of the multi-layer combination detector, the Haar detector may be disposed sequentially downward from an uppermost layer to use odd numbered layers such as a first layer, a third layer, a fifth layer, and the like, and the MCT detector may use even numbered layers such as a second layer, a fourth layer, a sixth layer, and the like. Thus, the object detection may be satisfactorily performed using the complementary nature between characteristics of the Haar detector and the MCT detector, thereby obtaining relatively high operation efficiency.

The combination of a Haar detector and an MCT detector is merely an example, and thus exemplary embodiments are not limited thereto. A person skilled in the art may replace the MCT detector with a SIFT detector, an NMF detector, and the like to form a combination detector with the Haar detector, thereby performing an object detection.

Figure 6:
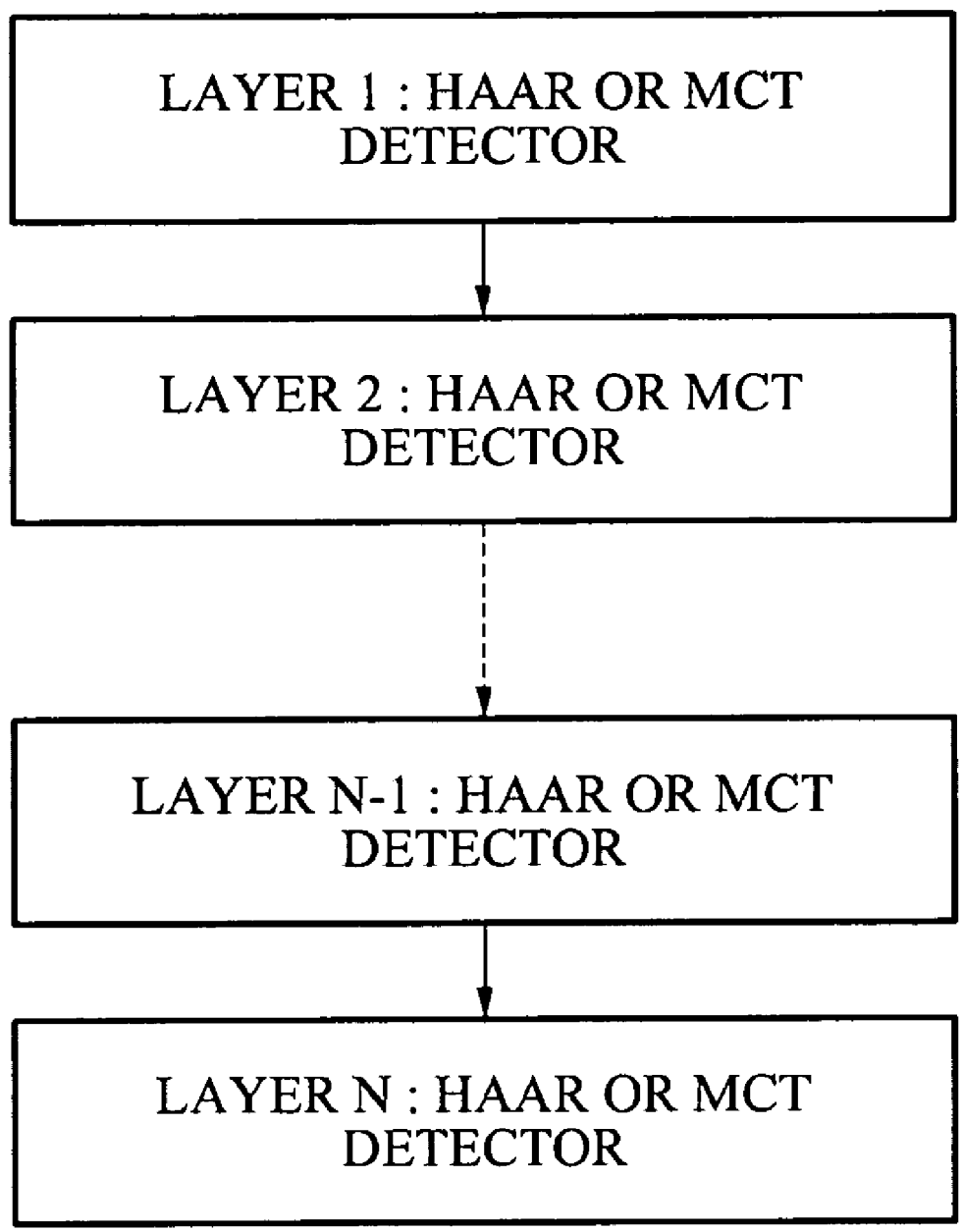
FIG. 6 is a schematic view illustrating a method of detecting an object using a combination detector according to still other exemplary embodiments.

FIG. 6 is a schematic view illustrating a method of detecting an object using a combination detector according to still other exemplary embodiments. Referring to FIG. 6, object detection may be performed using a combination scheme of the Haar detector and the MCT detector. In an embodiment, a determination as to which layer the Haar detector and the MCT detector are disposed in may need to be specifically made in accordance with a training process of an object to be detected. For example, a performance function, based on a detection speed and detection effect of a sample, may be set to train each of the Haar detector and the MCT detector. In addition, a detector in which a selection performance of each layer is relatively superior based on the training result may be selected as a detector of a corresponding layer. In a human face detection training process, a detector generally located in an upper layer may be selected as a Haar detector, and a detector generally located in a lower layer may be selected as an MCT detector. In particular, the MCT detector may be located in the final two or three layers.

The combination of a Haar detector and an MCT detector is provided as merely an example, and thus exemplary embodiments are not limited thereto. A person skilled in the art may replace the MCT detector with a SIFT detector, an NMF detector, and the like to form a combination detector with the Haar detector, thereby performing an object detection.

FIG. 7 is a schematic view illustrating a state where an object is detected using a plurality of viewing angles using a method of detecting an object using a combination detector according to exemplary embodiments. Example embodiments described at FIGS. 4 to 6 may be directly adapted to perform simple object detection. For example, it is possible to detect a front of a human face. Also, example embodiments of FIGS. 4 to 6 may be actively adapted to perform object detection with respect to relatively complex appearances of a face. More specifically, with respect to face detection with a plurality of appearances, an object detected depending on angles may be divided into a plurality of sub classes, and any one of example embodiments of FIGS. 4 and 6 may be selected for each of the plurality of sub classes, or all detection results of the plurality of sub classes may be used as a final object detection result.

The above described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as code produced by a compiler, and files containing higher level code that may be executed by the computer using an interpreter. The described hardware devices may be configured to act as one or more software modules in order to perform the operations and methods described above, or vice versa. The software modules may be executed on any processor, general purpose computer, or special purpose computer including a combination detector apparatus.

As described above, according to exemplary embodiments, the method of detecting an object using the combination detector may overcome limitations of a conventional single detector, and actively select a detector being suitable for each layer, thereby ensuring a detection effect, and improving an operation speed.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A method of detecting an object using a combination detector including a processor having executable instructions, the method comprising:
    combining a first detector and a second detector in a combination scheme to form a multi-layer combination detector, the second detector being of a type different from that of the first detector;
    processing a binary classification detection with respect to an inputted sample starting from an uppermost layer detector;
    allowing a sample of an object detected from a current layer to approach a lower layer, and rejecting a sample of a non-object detected from the current layer so that the non-object may not approach the lower layer; and
    outputting, by way of the processor, a sample passing through all layers as a detected object,
    wherein in the combination scheme, the first detector and the second detector are alternately located in each layer of the multiple layers.

2. The method of claim 1, wherein the first detector is a Haar detector, and the second detector is at least one of a Modified Census Transform (MCT) detector, a Scale Invariant Feature Transform (SIFT) detector, and a Non-negative Matrix Factorization (NMF) detector.

3. The method of claim 1, wherein in the combination scheme, the first detector is located in n-layers sequentially from the uppermost layer of the multi-layer combination detector, and the second detector is located in an (n+1)-layer to an (n+m)-layer of remaining layers of the multi-layer combination detector.

4. The method of claim 1, wherein the first detector is located in an odd numbered layer and the second detector is located in an even numbered layer.

5. The method of claim 1, wherein the combination scheme sets a performance function based on a detection speed and a detection effect of a sample to train each of the first detector and the second detector, and selects, as a detector of a corresponding layer, a detector in which a selection performance of each layer is relatively superior based on the training result.

6. A method of detecting an object using a combination detector including a processor having executable instructions, the method comprising:
    classifying a plurality of appearance images into a plurality of sub classes in accordance with a viewing angle;
    combining a first detector and a second detector in a combination scheme with respect to the each of the plurality of sub classes to form a multi-layer combination detector, the second detector being of a type different from that of the first detector;
    processing a binary classification detection with respect to an inputted sample starting from an uppermost layer detector;
    allowing a sample of an object detected from a current layer to approach a lower layer;
    rejecting a sample of a non-object detected from the current layer so that the non-object may not approach the lower layer; and
    combining, by way of the processor, samples finally outputted by the combination detector of each of the plurality of sub classes to form the combined samples as a detected object
    wherein in the combination scheme, the first detector and the second detector are alternately located in each layer of the multi-layer.

7. The method of claim 6, wherein the first detector is a Haar detector, and the second detector is at least one of an MCT detector, a SIFT detector, and an NMF detector.

8. The method of claim 6, wherein in the combination scheme, the first detector is located in n-layers sequentially from the uppermost layer of the multi-layer combination detector, and the second detector is located in an (n+1)-layer to an (n+m)-layer of remaining layers of the multi-layer combination detector.

9. The method of claim 6, wherein the first detector is located in an odd numbered layer and the second detector is located in an even numbered layer.

10. The method of claim 6, wherein the combination scheme sets a performance function based on a detection speed and a detection effect of a sample to train each of the first detector and the second detector, and selects, as a detector of a corresponding layer, a detector in which a selection performance of each layer is relatively superior based on the training result.

11. A combination detector, in which a first detector and a second detector, the second detector being of a type different from that of the first detector, are combined, a binary classification detection with respect to an inputted sample is processed, a sample of an object detected from a current layer is allowed to approach a lower layer, a sample of a non-object detected from the current layer is rejected from approaching the lower layer, and a sample passing through all layers is outputted as a detected object, wherein the first detector and the second detector are alternately located in each layer of the multi-layer.

12. The combination detector of claim 11, wherein the first detector is a Haar detector, and the second detector is at least one of an MCT detector, a SIFT detector, and an NMF detector.

13. The combination detector of claim 11, wherein the first detector is located in n-layers sequentially from the uppermost layer of the multi-layer combination detector, and the second detector is located in an (n+1)-layer to an (n+m)-layer of remaining layers of the multi-layer combination detector.

14. The combination detector of claim 11, wherein the first detector is located in an odd numbered layer and the second detector is located in an even numbered layer.

15. The combination detector of claim 11, wherein a performance function based on a detection speed and a detection effect of a sample is set to train each of the first detector and the second detector, and a detector in which a selection performance of each layer is relatively superior based on the training result is selected as a detector of a corresponding layer.

16. A combination detector, in which a first detector and a second detector, the second detector being a type different from that of the first detector, are combined, a plurality of appearance images are classified into a plurality of sub classes in accordance with a viewing angle, a binary classification detection is processed with respect to an inputted sample of the plurality of sub classes, a sample of an object detected from a current layer is allowed to approach a lower layer, a sample of a non-object detected from the current layer is rejected from approaching the lower layer, and final samples passing through all layer are combined as a detected object, wherein the first detector and the second detector are alternately located in each layer of the multi-layer.

17. The combination detector of claim 16, wherein the first detector is a Haar detector, and the second detector is at least one of an MCT detector, a SIFT detector, and an NMF detector.

18. The combination detector of claim 16, wherein the first detector is located in n-layers sequentially from the uppermost layer of the multi-layer combination detector, and the second detector is located in an (n+1)-layer to an (n+m)-layer of remaining layers of the multi-layer combination detector.

19. The combination detector of claim 16, wherein the first detector is located in an odd numbered layer and the second detector is located in an even numbered layer.

20. The combination detector of claim 16, wherein a performance function based on a detection speed and a detection effect of a sample is set to train each of the first detector and the second detector, and a detector in which a selection performance of each layer is relatively superior based on the training result is selected as a detector of a corresponding layer.

21. At least a non-transitory medium comprising computer readable instructions implementing the method of claim 1.

22. At least a non-transitory medium comprising computer readable instructions implementing the method of claim 6.

* * * * *

UNITED STATES PATENT AND TRADEMARK OFFICE
CERTIFICATE OF CORRECTION

PATENT NO. : 8,325,983 B2
APPLICATION NO. : 12/585570
DATED : December 4, 2012
INVENTOR(S) : Haibing Ren et al.

It is certified that error appears in the above-identified patent and that said Letters Patent is hereby corrected as shown below:

In the Claims

Column 8; Line 45; In Claim 6, delete "object" and insert -- object, --, therefor.

Signed and Sealed this
Fourteenth Day of May, 2013

Teresa Stanek Rea
*Acting Director of the United States Patent and Trademark Office*